C. P. LANDRETH.
METHOD AND MEANS FOR TREATING ELECTRODES.
APPLICATION FILED FEB. 21, 1913.
1,099,654.
Patented June 9, 1914.
2 SHEETS—SHEET 2.
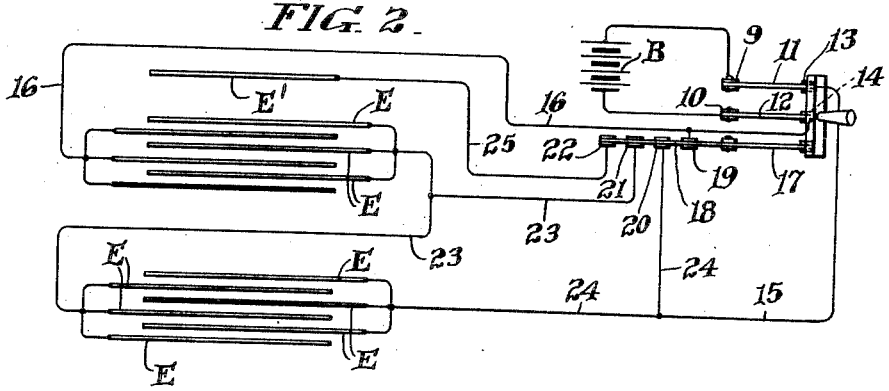
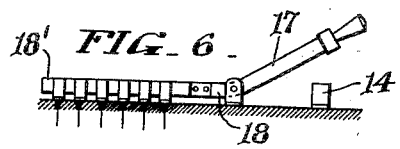
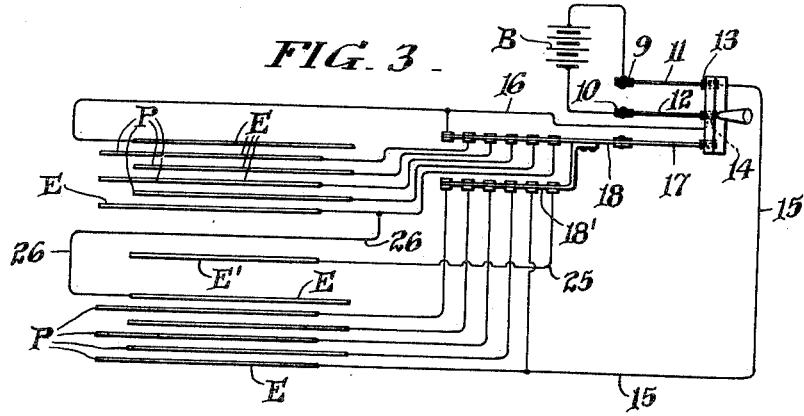
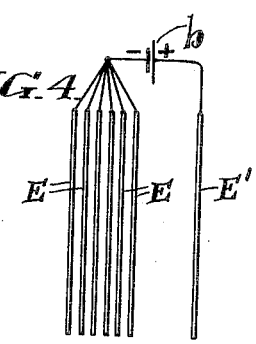
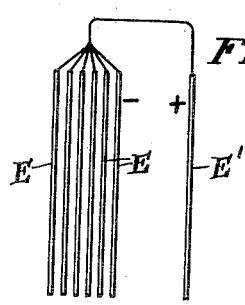
Witnesses
Daniel Webster Jr.
William Conway
Inventor
Clarence P. Landreth
By Cornelius D. Ehret
Lee Attorney

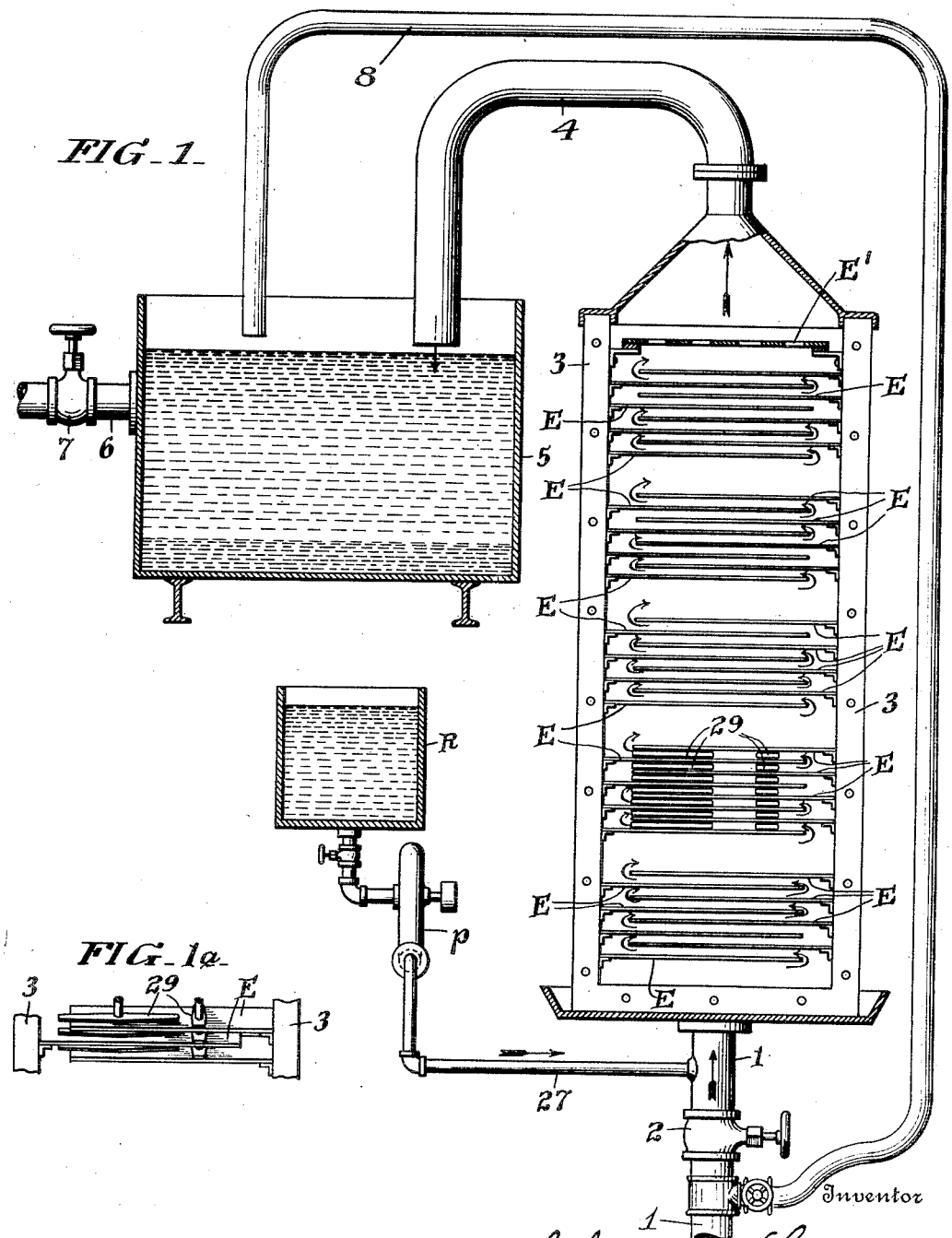

UNITED STATES PATENT OFFICE.

CLARENCE P. LANDRETH, OF PHILADELPHIA, PENNSYLVANIA.

METHOD AND MEANS FOR TREATING ELECTRODES.

1,099,654.  Specification of Letters Patent.  Patented June 9, 1914.

Application filed February 21, 1913. Serial No. 749,764.

*To all whom it may concern:*

Be it known that I, CLARENCE P. LANDRETH, a citizen of the United States, residing in the city of Philadelphia, county of Philadelphia, and State of Pennsylvania, have invented certain new and useful Improvements in Methods and Means for Treating Electrodes, of which the following is a specification.

My invention resides in a method of and means for prevention of the coating or oxidation, when out of use, of the electrodes of electrolytic apparatus, in the electrolytic treatment of liquids, particularly when such electrodes are of iron. When no current is being passed through the electrolytic apparatus, I maintain the electrodes electro-negative to prevent coating or oxidation.

For an illustration of some of the forms the apparatus may take for carrying out my method, reference is to be had to the accompanying drawings, in which:

Figure 1 is a vertical sectional view, some parts in elevation, through apparatus for electro-chemically treating liquid. Fig. 1ª is a plan view of paddles used for agitating the liquid. Fig. 2 is a diagrammatic view illustrating a method of connection of electrodes both when electro-chemically treating a liquid and when idle. Fig. 3 is a diagrammatic view illustrating a modified arrangement of electrodes for similar purposes. Fig. 4 is an elemental diagrammatic view of electrodes and associated means for maintaining the electrodes electro-negative to prevent oxidation or coating when the operating current is shut off. Fig. 5 is a modification for the same purpose as the arrangement of Fig. 4. Fig. 6 is a side elevational view of the switch for disconnecting the electrodes from a source of current and for connecting the electrodes in such manner as to maintain them electro-negative while idle.

Referring to Fig. 1, the liquid to be treated, or the raw water, enters through pipe 1 and valve 2 into the bottom of the treating chamber or tank 3 and out through its top through pipe 4 into a sedimentation or filtration tank 5 from which the finished liquid or water passes out through pipe 6 and valve 7, which is here arranged above the bottom of the tank 5 which may be considered as a sedimentation tank. The entire volume of liquid or water to be treated may be passed through the chamber 3 as described, or any desired percentage of the liquid or water may be by-passed and delivered into the tank 5, for example, through the pipe 8. In other words only a small fraction of the entire water or liquid to be treated may be passed through the tank 3 and the water or liquid after treatment may be again mixed with the remainder of the raw liquid or water. Within the tank 3 are disposed the electrodes E which are spaced and insulated from each other and so disposed that the liquid passes in a zig-zag direction backwardly and forwardly across the tank 3 as indicated by the small arrows, the liquid traversing the spaces between electrodes a great number of times before passing out through the pipe 4. In the spaces between the electrodes I provide paddles 29 or other means rotating parallel to the faces of the electrodes to render possible a continuous formation of hydroxid and at the same time to agitate the liquid and to remove any gases, sediment, hydroxid, etc. adhering to the electrodes. At any suitable point within the liquid within the tank 3 I provide a plate or electrode E', here shown near the top of the tank, whose purpose will be hereinafter explained.

The electrodes E may be connected in any suitable way to a source of current so that the current will pass through the small volume of water which may at any time be between two adjacent electrodes. For example, as illustrated in Fig. 2, one-half of the electrodes of one group are electrically connected together, and the other electrodes of the same group are electrically connected together, and the different groups are connected in series with each other. The source of energy B, of suitable voltage and capacity, has its one terminal connected to the switch contact 10 and its other terminal to switch contact 9. The switch blades 11 and 12 electrically connect these terminals respectively with the terminals 13 and 14 which connect by conductors 15 and 16 respectively with the terminals of the groups of electrodes. The result is that when the switch is closed current will pass from the source B through the liquid between adjacent electrodes, from one group through the next, and so on in series. The switch has a third blade 17 which is insulated from the blades 11 and 12, and has a rearward extension 18 adapted to simultaneously bridge contacts 19, 20, 21 and 22, which it is able to do only when the blades 11 and 12 are separated from contacts 13 and 14, because the blade 18 is disposed at an angle with respect to the blades 11, 12 and 17 as will more readily appear from Fig. 6.

The electrode E', which has been referred to above, is connected to a contact or terminal 22; one-half of the electrodes of each group are connected by conductor 23 to the contact 21; the remaining electrodes of the lower group are connected through conductor 24 with contact 20; and the remaining electrodes of the upper group are connected through conductor 16 with the contact 19. When electrical communication between source B and the electrodes is interrupted, the blade 18 connects these contacts 19 and 22 together with the result that all the electrodes E are connected with each other and through the conductor 25 with the electrodes or blade E' which may be of zinc or other suitable material. Assuming the electrodes E to be iron or some material electro-negative to zinc and the electrode E' to be of zinc, we have in effect an electric battery within the tank 3, the liquid or water forming the electrolyte. The result is that the electrodes E are maintained electro-negative with the result that rust or other coating does not form when the apparatus is idle, that is, when current is not being passed through the electrodes for water or liquid treatment. It will be seen that the electrode or plate E' is idle during the electrical treatment of the water or liquid because when the electrodes are connected by the switch to the source B, the blade 18 is separated from the contacts 19 and 22.

In Fig. 3 when the switch is closed to the source B, current flows through conductors 15 and 16 and through the liquid between two pairs of electrodes E, E the upper electrode E of the lower pair being connected to the lower electrode of the upper pair by conductor 26. Between each pair of electrodes are a plurality of plates, preferably of the same material as the electrodes, though of different material when required but isolated from direct communication with the source of current. In this case the water or liquid passes in a zig-zag direction as explained in connection with Fig. 1 between pairs of electrodes while the current passes from electrode E through the liquid and through the intervening plates in succession to the other electrode. In this case the cross section of the liquid, such as the horizontal cross section of the tank 3, is restricted, and the intervening plates P have a surface very nearly as large as this cross section of the liquid. The result is that the current will find its easiest path across the small volumes of liquid between the electrode and the plate or between the plates and through the plates to the other electrode. But since it is at the regions at and close to the surfaces of the plates and electrodes that the greatest electro-chemical activity occurs we have by this arrangement a multiplication of such active surfaces though the intervening plates are not directly connected to the source of current or to the other electrodes as in Fig. 2. Here again the zinc or other plate E' is connected to the plates and electrodes by the switch blades 18, 18' when the connection between the source B and the electrodes is open, as will appear from Fig. 6.

The use of the zinc or other plate E' as illustrated in Figs. 2 and 3 is more simply illustrated in Fig. 5 where it is seen that all the electrodes or electrodes and plates are connected together and thence connect externally through the liquid or water to the plate E'. This arrangement maintains the electrode E, or the electrodes and plates electro-negative with the result above stated. Or as illustrated in Fig. 4 the plate E' may be of other suitable material or of the same material as the electrodes, and in the external connection from the plates or electrodes to the plate E' may be inserted a source of current $b$ so connected as to make the electrodes E and the plates electro-negative, while the plate E' is electro-positive. This accomplishes the same result.

If the arrangements of Figs. 2 and 3 are to correspond with the arrangement of Fig. 4 there may be inserted in the conductor 25 of Fig. 2 or the conductor 25 of Fig. 3 a source of current such as $b$ of Fig. 4, properly connected, as described, to maintain the plates or electrodes electro-negative and the plate E' electro-positive.

What I claim is:

1. In electrolytic apparatus, the combination with an electrolyte and positive and negative electrodes immersed therein, of means normally passing current through said electrolyte and said electrodes, a mass of material in said electrolyte electro-positive with respect to said electrodes and normally out of their circuit, and means for making a connection from said mass to said positive and negative electrodes outside of said electrolyte after said normal current is discontinued.

2. In electrolytic apparatus, a plurality of electrodes immersed in an electrolyte, a source of electrical energy, a mass of material in said electrolyte electro-positive with respect to said electrodes, and switching mechanism for breaking connection from said source of energy to said electrodes and connecting said electrodes with said mass of material outside of said electrolyte.

3. The method which consists in passing current through an electrolyte and metal electrodes immersed therein and normally maintained positive and negative by said current, discontinuing said current, and thereafter maintaining both positive and negative electrodes electro-negative.

4. In electrolytic apparatus, the combination with an electrolyte, of electrodes immersed therein and normally maintained positive and negative, means for connecting together both the normally positive and the normally negative electrodes, and means for maintaining all of said electrodes electro-negative.

In testimony whereof I have hereunto affixed my signature in the presence of the two subscribing witnesses.

CLARENCE P. LANDRETH.

Witnesses:
JULIAN S. SIMSOHN,
W. N. MACVAUGH.